United States Patent
Lee

(10) Patent No.: US 8,644,012 B2
(45) Date of Patent: Feb. 4, 2014

(54) POWER FEEDING METHOD TO AN ANTENNA

(75) Inventor: Sunggyoo Lee, Tokyo (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 420 days.

(21) Appl. No.: 12/974,129

(22) Filed: Dec. 21, 2010

(65) Prior Publication Data

US 2012/0155005 A1 Jun. 21, 2012

(51) Int. Cl.
*G06F 1/16* (2006.01)

(52) U.S. Cl.
USPC .............. 361/679.26; 343/876; 343/702

(58) Field of Classification Search
USPC .................................. 361/679.26
See application file for complete search history.

(56) References Cited

U.S. PATENT DOCUMENTS

| 6,717,801 | B1 * | 4/2004 | Castell et al. | 361/679.41 |
|---|---|---|---|---|
| 6,870,733 | B2 * | 3/2005 | Castell et al. | 361/679.56 |
| 7,057,560 | B2 | 6/2006 | Erkocevic | |
| 7,379,025 | B2 * | 5/2008 | Asano et al. | 343/702 |
| 7,719,473 | B2 * | 5/2010 | Asano et al. | 343/702 |
| 7,956,813 | B2 * | 6/2011 | Arima et al. | 343/702 |
| 7,957,136 | B2 * | 6/2011 | Murakami | 361/679.55 |
| 8,035,567 | B2 * | 10/2011 | Asano et al. | 343/702 |
| 2007/0076362 | A1 * | 4/2007 | Lagnado | 361/683 |
| 2007/0229366 | A1 | 10/2007 | Kim et al. | |
| 2008/0129666 | A1 | 6/2008 | Shimotono et al. | |
| 2009/0284438 | A1 * | 11/2009 | Matsunaga et al. | 343/876 |
| 2010/0149751 | A1 * | 6/2010 | Camacho et al. | 361/679.55 |

FOREIGN PATENT DOCUMENTS

JP 2004-336795 A 11/2004

OTHER PUBLICATIONS http://shop.lenovo.com/SEUILibrary/controller/e/web/LenovoPortal/en_US/catalog.workflow:category.details?current-catalog-id=12F0696583E04D86B9B79BOFEC01C087&current-category-id=329576204C9E42289967E79E0E7C9A2D&tabname=Gallery.

* cited by examiner

*Primary Examiner* — Lisa Lea Edmonds
(74) *Attorney, Agent, or Firm* — Shimokaji & Associates, P.C.

(57) ABSTRACT

An electronic apparatus may comprise a screen housing, an antenna, and a waveguide. The screen housing may have a display side and an opposing rear side wherein the display side is a side from which a screen in the screen housing is viewable. The antenna may be disposed on the display side of the screen housing. The waveguide may have a first end and a second end. The first end may be coupled to a feeding point of the antenna. The second end may be coupled to a coaxial cable.

14 Claims, 5 Drawing Sheets

US 8,644,012 B2

POWER FEEDING METHOD TO AN ANTENNA

BACKGROUND OF THE INVENTION

The present invention relates generally to antennas for wireless communication systems and, more specifically, to an apparatus and power feeding method to antennas which can be used in convertible tablet personal computers (PCs).

In recent years, portable computers have evolved from transportable suitcase style computers, to laptops or notebooks, and then to slate PCs (also referred to as "tablets" or "pure tablets"). The tablets, such as convertible tablet personal computers (PCs), may be used in both a laptop mode and a tablet mode. In the tablet mode, a lid is closed with a liquid crystal display (LCD) facing up and viewable.

When the convertible tablet PC is in the laptop mode, the lid is open in an upright position with respect to the main body of the convertible PC. Antennas, such as those used for wireless communications, can be located at the upper edge of the lid for better radio frequency clearance. However, when in the tablet mode, the antennas lay side-by-side with the tablet main body and radio waves may not be emitted or received effectively for wireless communications.

Therefore, it can be seen that there is a need for a convertible tablet PC having an effective antenna for wireless communications in both the laptop mode and the tablet mode.

SUMMARY

In one aspect, an electronic apparatus comprises a screen housing having a display side; an antenna disposed on the display side of the screen housing; and a waveguide having a first end and a second end, wherein the first end is coupled to a feeding point of the antenna, wherein the second end is coupled to a coaxial cable.

In another aspect, a computer system comprises a lower housing having a wireless device; an upper housing having a display side, a coaxial cable electronically connected to the wireless device, wherein the coaxial cable extends into the upper housing; and an antenna disposed on the display side of the upper housing, wherein the antenna is located at a predetermined distance from and operationally connected to the waveguide in the upper housing.

In a further aspect, a convertible PC comprises a lower housing; an upper housing having a screen carried on a screen side and a cover carried on a second, opposite side, wherein the upper housing is operably coupled to the lower housing for movement between a tablet use mode and a regular use mode; an antenna disposed on the screen side of the upper housing; and a waveguide coupled to a conductive cable and the antenna.

These and other features, aspects and advantages of the present invention will become better understood with reference to the following drawings, description and claims.

DETAILED DESCRIPTION OF EMBODIMENTS

Figure 1A:
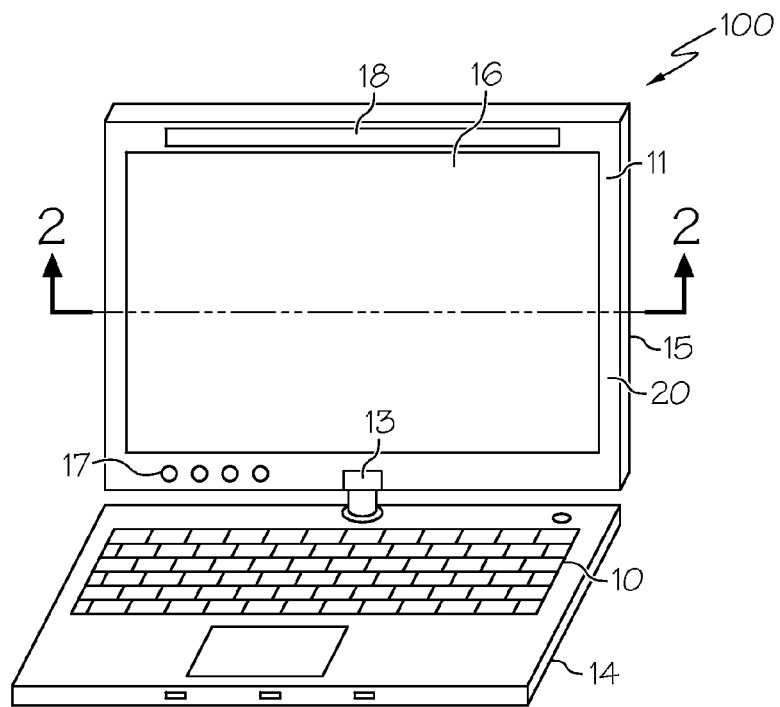
FIG. 1A is an isometric view of a convertible tablet personal computer (PC) in a laptop mode or regular use mode.

The following detailed description is of the best currently contemplated modes of carrying out exemplary embodiments. The description is not to be taken in a limiting sense, but is made merely for the purpose of illustrating the general principles, since the scope of the embodiments is best defined by the appended claims.

Various inventive features are described below that can each be used independently of one another or in combination with other features.

Broadly, exemplary embodiments comprise a power feeding method and apparatus for a convertible tablet PC which may be used in a laptop mode (regular use mode) or a tablet mode. More specifically, a microstrip line or coplanar line may be coupled to a coaxial cable with a feeding point of an antenna. According to exemplary embodiments, the coaxial cable may be provided through one or more hinges, coupling the base to the lid, and wired from the back side of a liquid crystal display (LCD) unit to the microstrip line or coplanar line. The antenna may be positioned in a display side, close to a front bezel and the top edge of the LCD unit. There may be a predetermined gap between the antenna and the coaxial cable. In the laptop mode, the antenna may get effective radio frequency clearance since it is situated at the top of the LCD unit. In the tablet mode, the gap may also set apart between the antenna and the base, which may be made of metal, for example. The gap may decrease the interference between the antenna and the coaxial cable/the metallic base. The antenna may be disposed in a direction orthogonal to the LCD screen to also get effective radio frequency clearance.

Referring to FIGS. 1A-1D, there are illustrated isomeric views of an electronic computing device, such as a convertible tablet PC 100, for example. The tablet PC 100 may include a lower housing (main-body-side housing) 14 and an upper housing (screen housing) 15, both of which may have a substantially rectangular parallelpiped shape. The main-body-side housing 14 may include an input section 10 having a keyboard and a pointing device (not shown). The main-body-side housing 14 may further include a wireless device, such as wireless transceiver (not shown). The screen housing 15 may include a display side 20 for displaying data and an opposing rear side 22 where the display side 20 may include a screen 11 in which a touch panel input section 16 may be superimposed on a liquid crystal to enable input using a touch pen or a finger.

The main-body-side housing 14 and the screen housing 15 may be coupled through a coupling portion 13, such as a hinge, for example. The coupling portion 13 may freely swivel the housings 14, 15 to allow conversion between a laptop mode (FIG. 1A) and a tablet mode (FIG. 1D), as shown, for example, in FIGS. 1B and 1C. The screen housing 15 may be rotated at least 180 degrees in a state where the screen housing 15 is opened with respect to the main-bodyside housing 14. In a regular use mode depicted in FIG. 1A, the tablet PC 100 may be used as a regular notebook PC by an operation with respect to the input section 10. Moreover, when the coupling section 13 is rotated as shown in FIG. 1B and the screen housing 15 is folded to overlap the main-body-side housing 14 as depicted in FIG. 1C so that a display plane of the screen 11 faces up, a tablet use mode shown in FIG. 1D may be realized. In the tablet use mode, the tablet PC 100 may be used by an operation with respect to the touch panel input section 16.

A screen direction rotation button 17 may be provided at a peripheral part of the screen 11 in the screen housing 15. The screen housing 15 may be rotated in a predetermined direction 90 degrees each time when a user presses the screen direction rotation button. With regard to a rotating direction, the screen may be rotatable in clock-wise, counterclockwise directions or any selected direction.

An antenna 18 may be provided in the display side 20 of the screen housing 15 to connect the tablet PC 100 with a wireless network, e.g., a wireless local area networks (WLAN), broadband wireless access (BWA) networks, ultra-wide-band (UWB) networks, Bluetooth™ systems, or cellular-type systems, for example.

Figure 2:
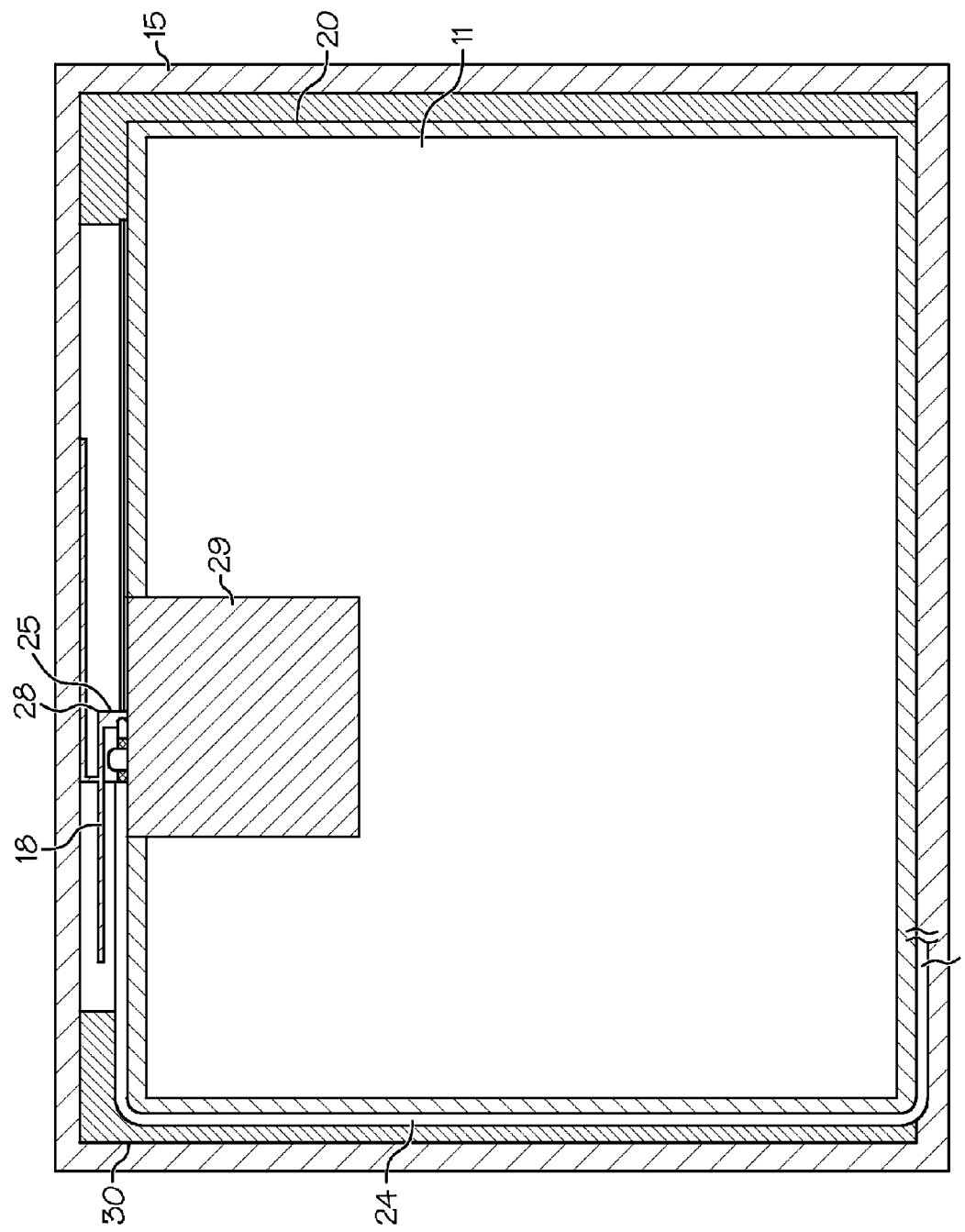
FIG. 2 is a front sectional view of an upper housing of the convertible tablet PC taken along line 2-2 of FIG. 1A.

FIG. 2 depicts a front sectional view of the antenna 18, an electrically conducting cable, such as a coaxial cable 24, and a waveguide 25 of the display side 20 in the upper housing 15 of the convertible tablet PC 100. An exemplary embodiment of the antenna 18 may be a planar inverted-F (type) antenna (PIFA). The antenna 18 may be located on the top of the convertible tablet PC 100 when the screen housing 15 is opened to be in an upright position with respect to the main-body-side housing 14. The antenna 18 may be used to transmit and receive radio signals.

The coaxial cable 24 may have one end 27 which may pass through one or more hinges coupling the main-body-side housing 14 to the upper housing 15. The coaxial cable 24 may be wired from the back side around the periphery of the screen 11. The waveguide 25, which may be a coplanar line 46 (shown in FIG. 4A) or a microstrip line 42 (shown in FIG. 4B), may connect the coaxial cable 24 and a feeding point 28 of the antenna 18. A ground plate 29, which may be made of conductive materials, such as metal, may be used as a ground plane for the antenna 18. The ground plate 29 may be disposed behind the screen 11 and in a direction orthogonal to the waveguide 25. The cover 30 on the outer portion of the screen housing 15 that covers the antenna 18 may be made of non-metallic material so that wireless communications signal may not be absorbed by the cover 30, thus the receiving capability of the antenna 18 may not be degraded by the cover 30.

In some embodiments, the antenna 18 may comprise directional or omnidirectional antennas, including, dipole antennas, monopole antennas, loop antennas, microstrip antennas, or other types of antennas suitable for transmission of radio-frequency (RF) signals. In some embodiments, instead of one antenna, two or more antennas may be used.

In some embodiments, the antenna 18 may comprise patch antennas having dimensions selected to communicate narrower-band RF signal between 2 and 11 GHz for some WLANs and BWA networks. In some embodiments, the antenna 18 may comprise a wide band antenna selected to communicate UWB RF signals.

Figure 1B:
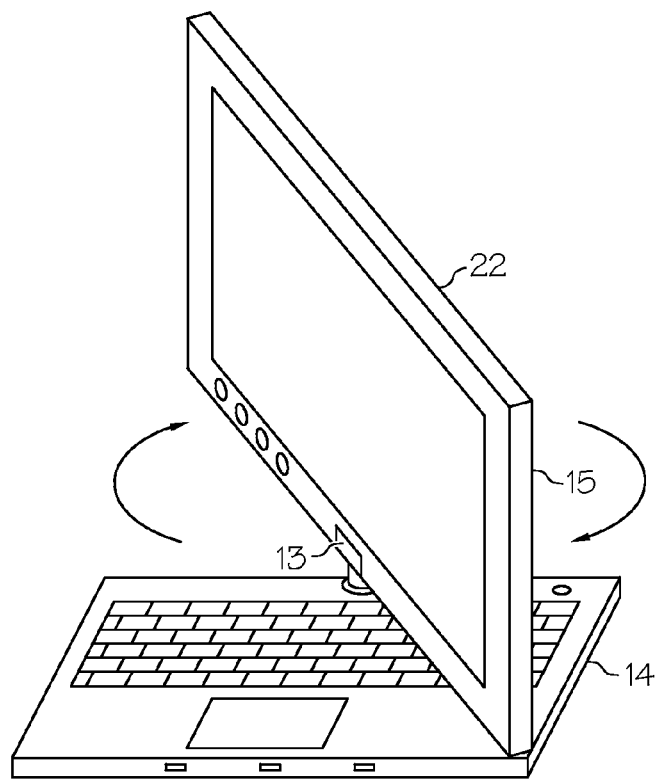
FIG. 1B is an isometric view of the convertible tablet PC of FIG. 1A having its display rotated to convert the convertible tablet PC into a tablet mode.
Figure 1C:
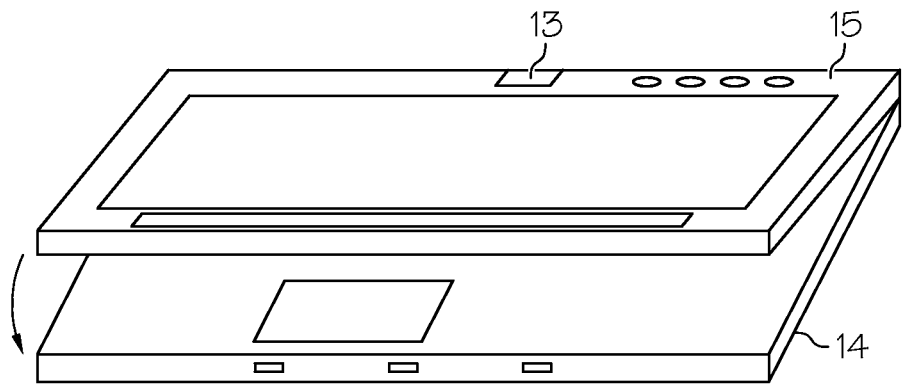
FIG. 1C is an isometric view of the convertible tablet PC of FIG. 1A having its display closed to convert the convertible tablet PC into the tablet mode.
Figure 1D:
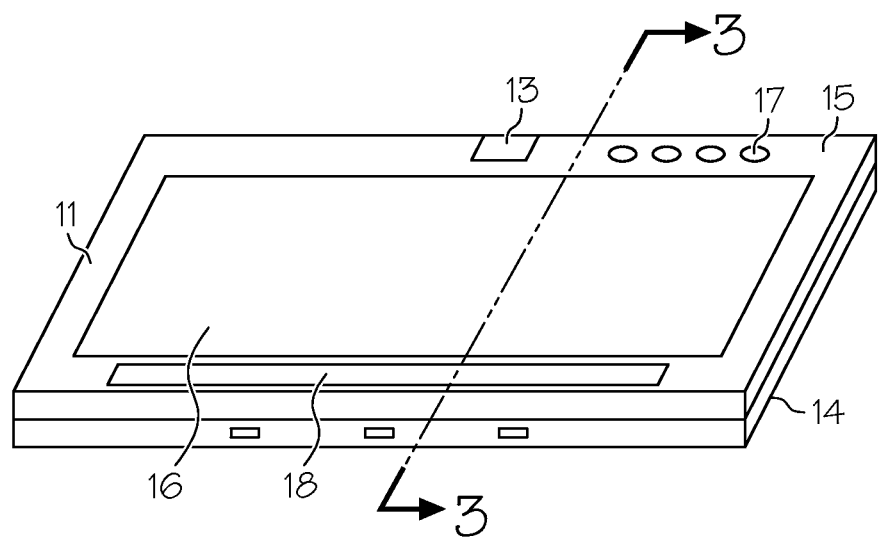
FIG. 1D is an isometric view of the convertible tablet PC of FIG. 1A in a tablet mode.
Figure 3:
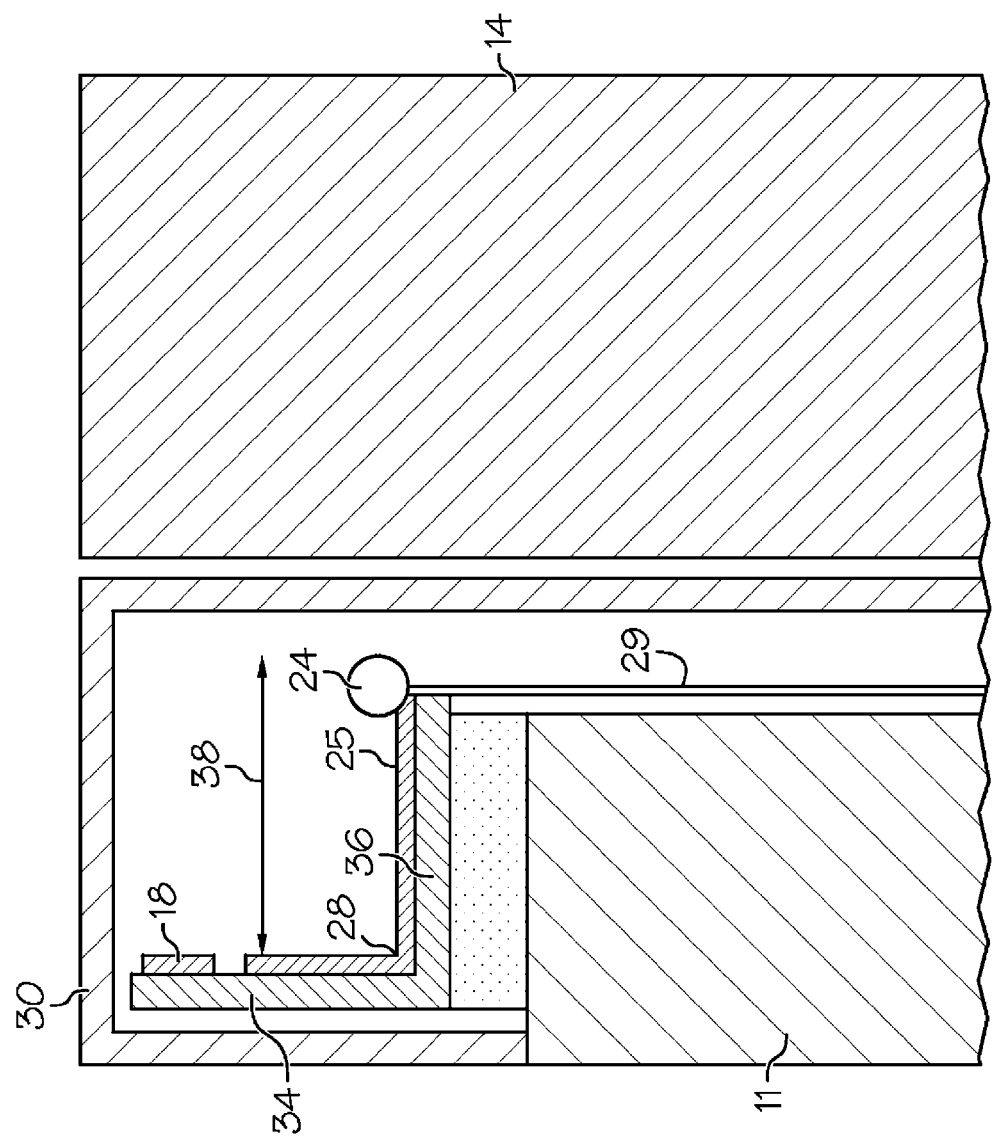
FIG. 3 is a cross sectional view of the upper housing of the convertible tablet PC taken along line 3-3 of FIG. 1D.

FIG. 3 depicts a cross sectional view of the upper housing of the convertible tablet PC taken along line 3-3 of FIG. 1D. The antenna 18 may be designed and made on an FR-4 printed circuit board (PCB) 34, or other plastic materials, for example. Coplanar ground plane 48 (shown in FIG. 4A) or microstrip ground plane 44 (shown in FIG. 4B) may also be made of FR-4 printed circuit board 36, for example, with conductive materials on the surface. The coplanar ground plane 48 or microstrip ground plane 44 may be situated vertically to the antenna 18.

The waveguide 25 may be coupled with the coaxial cable 24 and the feeding point 28 of the antenna 18. There may be a predetermined gap 38 between the antenna 18 and the coaxial cable 24. In addition, the gap 38 may set apart between the antenna 18 and the main-body-side housing 14. The gap 38 may help decrease or even eliminate the interference between the coaxial cable 24 and the antenna 18. When in the tablet mode, as shown in FIG. 1D and FIG. 3, the main-body-side housing 14, which may be made of conductive materials, such as metal, for example, may be disposed adjacent to and substantially parallel to the rear side 22 of the screen housing 15. The gap 38 may help decrease or even eliminate the interference between the antenna 18 and the metallic main-body-side housing 14.

Figure 4B:
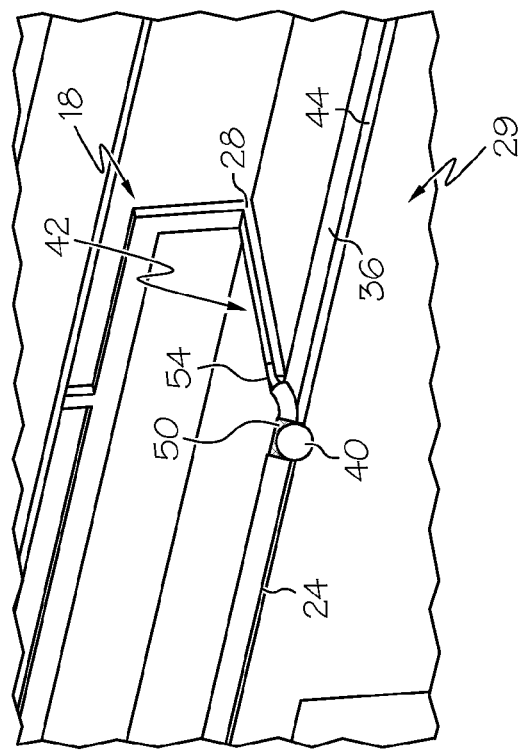
FIG. 4B is a detailed perspective view of a microstrip line connected to a waveguide and an antenna of the convertible tablet PC of FIG. 1A.
Figure 4A:
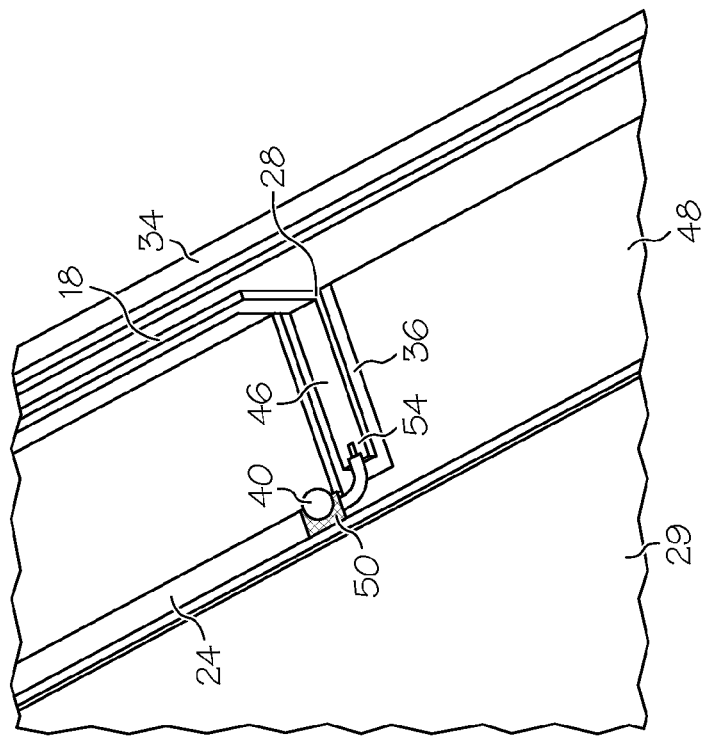
FIG. 4A is a detailed perspective view of a coplanar line connected to a waveguide and an antenna of the convertible tablet PC of FIG. 1A.

FIG. 4A is a detailed perspective view of the coplanar line 46 connected to the coaxial cable 24, and the antenna 18 of the convertible tablet PC of FIG. 1A. An inner metal 54 of the coaxial cable 24 may be connected to the coplanar line 46. The coplanar line 46 may be connected to the feeding point 28 of the antenna 18 by, e.g., soldering. An outer metal 50 of the coaxial cable 24 may be connected to the coplanar ground plane 48 by a soldering point 40.

FIG. 4B is a detailed perspective view of the microstrip line 42 connected to the coaxial cable and the antenna 18 of the convertible tablet PC of FIG. 1A. The inner metal 54 of the coaxial cable 24 may be connected to the microstrip line 42. The microstrip line 42 may be connected to the feeding point 28 of the antenna 18 by, e.g., soldering. The outer metal 50 of the coaxial cable 24 may be connected to the microstrip ground plane 44 and the antenna ground plane 29 by a soldering point 40.

In some embodiments, the electronic computing device 100 may be a personal digital assistant (PDA), a web tablet, a wireless telephone, a wireless headset, a pager, an instant messaging device, a digital camera, an access point, a television, a medical device (e.g., a heart rate monitor, a blood pressure monitor, etc), or other device that may receive and/or transmit information wirelessly.

It should be understood, of course, that the foregoing relate to exemplary embodiments of the invention and that modifications may be made without departing from the spirit and scope of the invention as set forth in the following claims.

I claim:

1. An electronic apparatus comprising:
   a screen housing having a display side;
   an antenna disposed on the display side of the screen housing; and
   a waveguide having a first end and a second end, wherein the first end is coupled to a feeding point of the antenna, and wherein the second end is coupled to a coaxial cable.

2. The electronic apparatus of claim 1, wherein the electronic apparatus is a personal computer.

3. The electronic apparatus of claim 1, wherein the coaxial cable is provided through a hinge, the hinge coupling a base of the computer system with the screen housing of the computer system.

4. The electronic apparatus of claim 1, wherein the waveguide comprises a coplanar line.

5. The electronic apparatus of claim 1, wherein the waveguide comprises a microstrip line.

6. The electronic apparatus of claim 1, wherein the antenna is a planar inverted-F (type) antenna (PIFA).

7. The electronic apparatus of claim 1, wherein the waveguide is located in a direction orthogonal to the screen.

8. The electronic apparatus of claim 1, wherein the antenna is disposed in a direction parallel to the screen.

9. The electronic apparatus of claim 1, wherein the antenna is located at a predetermined distance from the coaxial cable.

10. A convertible PC comprising:
   a lower housing;
   an upper housing having a screen carried on a screen side and a cover carried on a second, opposite side, wherein the upper housing is operably coupled to the lower housing for movement between a tablet use mode and a regular use mode;
   an antenna disposed on the screen side of the upper housing; and
   a waveguide coupled to a conductive cable and the antenna.

11. The convertible PC of claim 10, further comprising a predetermined gap between the coaxial cable and the antenna.

12. The convertible PC of claim 10, further comprising a ground plate in a direction orthogonal to the waveguide and parallel to the screen.

13. The convertible PC of claim 10, wherein the waveguide is disposed in a direction orthogonal to the antenna.

14. The convertible PC of claim 10, further comprising a predetermined gap between the antenna and the lower housing in the tablet use mode.

* * * * *